United States Patent
Yasukawa

(10) Patent No.: US 10,204,234 B2
(45) Date of Patent: Feb. 12, 2019

(54) IMAGE PROCESSING APPARATUS CAPABLE OF EFFICIENTLY DELETING STORED DATA, METHOD OF CONTROLLING THE SAME, AND STORAGE MEDIUM

(71) Applicant: CANON KABUSHIKI KAISHA, Tokyo (JP)

(72) Inventor: Akari Yasukawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 309 days.

(21) Appl. No.: 14/606,608

(22) Filed: Jan. 27, 2015

(65) Prior Publication Data

US 2015/0213273 A1    Jul. 30, 2015

(30) Foreign Application Priority Data

Jan. 29, 2014    (JP) .................................. 2014-014560

(51) Int. Cl.
*G06F 21/62*    (2013.01)

(52) U.S. Cl.
CPC .. *G06F 21/6218* (2013.01); *G06F 2221/2101* (2013.01); *G06F 2221/2143* (2013.01)

(58) Field of Classification Search
CPC ......... G06F 2221/2143; G06F 21/6245; G06F 21/6218; G06F 2221/2101; G11B 20/00666
See application file for complete search history.

(56) References Cited

U.S. PATENT DOCUMENTS 10,043,037 B1*  8/2018  Middleman ....... G06F 17/30371
2004/0114182 A1*  6/2004  Davis .................. G06F 11/0733
                                                        358/1.16
(Continued)

FOREIGN PATENT DOCUMENTS

CN        101465937 A    6/2009
CN        103425937 A    12/2013
(Continued)

OTHER PUBLICATIONS

Office Action issued in Chinese Patent Application No. 201510040821.2 dated Jun. 15, 2017. English translation provided.
(Continued)

*Primary Examiner* — Chau Le
(74) *Attorney, Agent, or Firm* — Rossi, Kimms & McDowell LLP

(57) ABSTRACT

An image processing apparatus reduced in a time period required to invalidate data while maintaining security against data leakage even in an environment in which encrypted data and unencrypted data are mixed. An image processing apparatus includes an HDD for storing data. Whether or not data stored in the HDD is encrypted is determined, and if it is determined that the data is encrypted, overwrite deletion is performed to make it impossible to read out an encryption key used when the data is encrypted or information necessary for creating the encryption key, whereas if it is determined that the data is not encrypted, overwrite deletion is performed to make it impossible to read out the data from the HDD.

10 Claims, 9 Drawing Sheets

(56) References Cited

U.S. PATENT DOCUMENTS

| | | | |
|---|---|---|---|
| 2008/0005561 A1* | 1/2008 | Brown | G06F 21/305 |
| | | | 713/164 |
| 2009/0049310 A1* | 2/2009 | Carlson | G11B 20/00086 |
| | | | 713/193 |
| 2009/0161513 A1* | 6/2009 | Senda | G06F 21/62 |
| | | | 369/53.21 |
| 2010/0296651 A1 | 11/2010 | Tkacik | |

FOREIGN PATENT DOCUMENTS

| | | |
|---|---|---|
| JP | 3715711 B2 | 11/2005 |
| JP | 2008009727 A | 1/2008 |
| JP | 4606808 B2 | 1/2011 |
| JP | 2012208798 A | 10/2012 |

OTHER PUBLICATIONS

Office Action issued in Japanese Appln. No. 2014014560 dated Dec. 5, 2017.

* cited by examiner

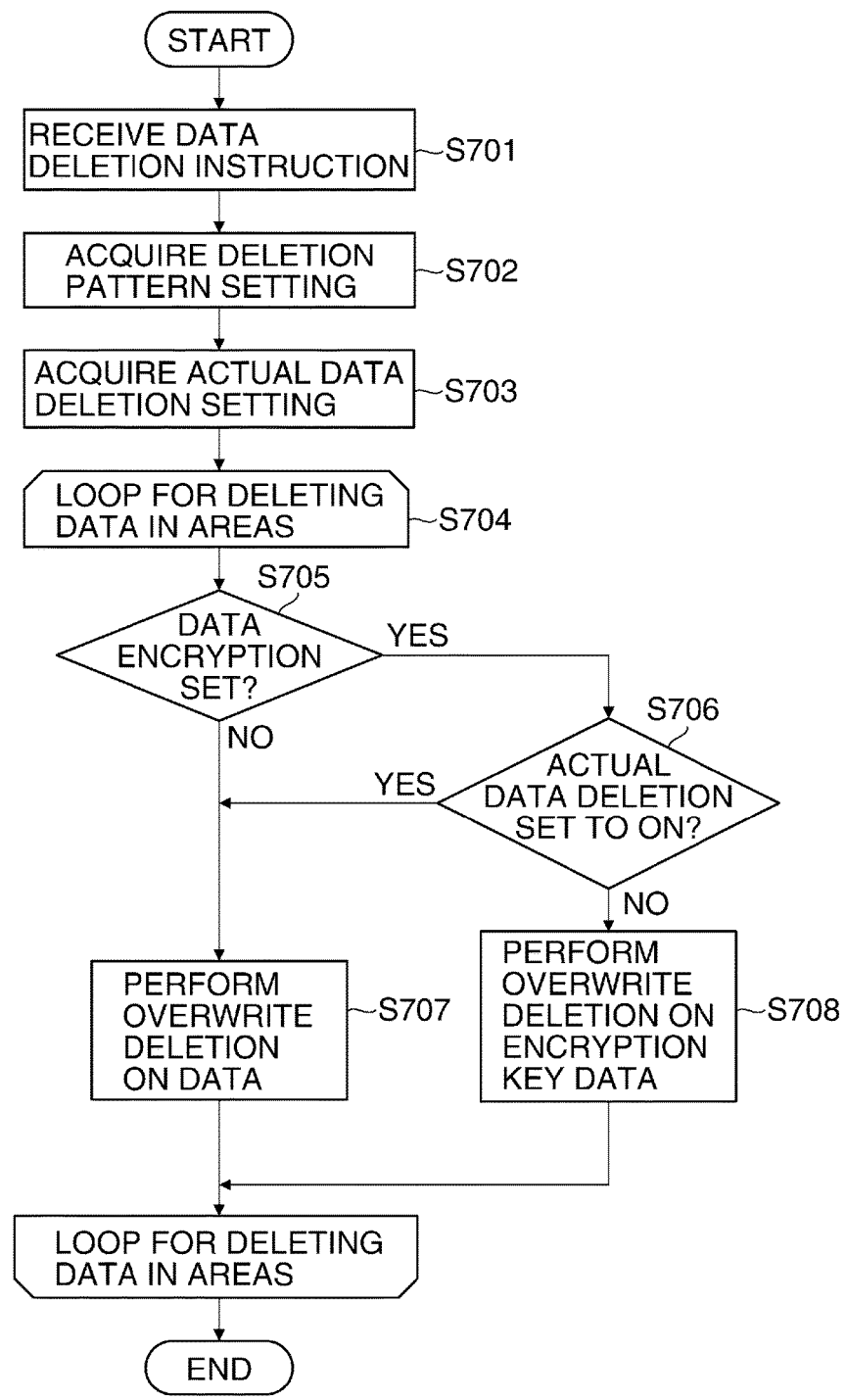

FIG. 8

| AREA NAME | STARTING ADDRESS OF AREA | ENCRYPTION SETTING | ENCRYPTION KEY INFORMATION |
|---|---|---|---|
| 1ST IMAGE FILE AREA | 100 | ON | key |
| 2ND IMAGE FILE AREA | 200 | ON | key |
| SETTING FILE AREA | 300 | ON | key |
| LOG AREA | 400 | ON | key |
| SYSTEM DATA AREA | 500 | OFF | - |
| TEMPORARY AREA | 600 | OFF | - |

IMAGE PROCESSING APPARATUS CAPABLE OF EFFICIENTLY DELETING STORED DATA, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium, and more particularly to a method of deleting encrypted data and unencrypted data stored in the image processing apparatus.

Description of the Related Art

Information processing apparatuses capable of accumulating information using a storage device, such as a hard disk drive (HDD), include one configured to temporarily store received information (hereinafter also referred to as "data") in the HDD, and delete the data from the HDD after completion of processing using the data. In this information processing apparatus, the HDD stores data and position information indicative of locations of the data on the HDD (hereinafter referred to as "the FAT (File Allocation Table)"). When data is deleted from the HDD, generally, only the FAT is deleted from the viewpoint of high-speed data deletion processing. The data remaining on the HDD is overwritten with other data sooner or later.

However, if the data remains on the HDD when the above-mentioned information processing apparatus is discarded, there is a fear that the data is stolen by removing the HDD from the information processing apparatus, and connecting the HDD to e.g. a computer (PC) for analyzing the data.

In recent years, as the awareness of information security increases, an overwrite deletion function for deleting not only a FAT but also data remaining on the HDD has come to be widely known. In an information processing apparatus having this overwrite deletion function, data is prevented from remaining by writing 0's, random numbers, or fixed values, over the data no longer needed, once or a plurality of times (see e.g. Japanese Patent No. 3715711).

However, when discarding the information processing apparatus, it is necessary to write overwriting data in all storage areas on the HDD, which brings about a problem that it takes a long time to perform overwrite processing in proportion to the capacity of the HDD. Further, as a method of protecting data on the HDD, data protection by encryption is widely used. In the publication of Japanese Patent No. 4606808, to solve the above-mentioned problem of the processing time, there has been proposed a method of reducing the overwrite processing time by performing, as a means for deleting encrypted data, overwrite deletion of a minimum amount of data required to be deleted so as to make it impossible to decrypt the encrypted data.

However, in the technique described in Japanese Patent No. 4606808, it is difficult to selectively and efficiently delete data on the storage device within a short time period in an environment in which an encrypted data area and an unencrypted data area are mixed on the storage device, or in an environment in which encryption of data depends on settings therefor.

SUMMARY OF THE INVENTION

The present invention provides a technique that improves user-friendliness of an image processing apparatus by reducing a time period required to invalidate data while maintaining security against data leakage even in an environment in which encrypted data and unencrypted data are mixed.

In a first aspect of the present invention, there is provided an image processing apparatus comprising a storage unit configured to store data, a determination unit configured to determine whether or not data stored in the storage unit is encrypted by an encryption unit, a first deletion unit configured to, in a case where it is determined by the determination unit that the data is encrypted, make it impossible to read out an encryption key used by the encryption unit or information necessary for creating the encryption key, and a second deletion unit configured to, in a case where it is determined by the determination unit that the data is not encrypted, make it impossible to read out the data stored in the storage unit.

In a second aspect of the present invention, there is provided an image processing apparatus comprising a storage unit configured to include an encrypted data area for storing data which is encrypted by an encryption unit, and an unencrypted data area for storing data which is not encrypted by the encryption unit, and a deletion unit configured to make it impossible to read out an encryption key used when data stored in the encrypted data area is encrypted by the encryption unit or information necessary for creating the encryption key, and make it impossible to read out data stored in the unencrypted data area from the storage unit.

In a third aspect of the present invention, there is provided a method of controlling an image processing apparatus including a storage unit that stores data, comprising determining whether or not data stored in the storage unit is encrypted, making it impossible, in a case where it is determined by said determining that the data is encrypted, to read out an encryption key used for encryption or information necessary for creating the encryption key, and making it impossible, in a case where it is determined by said determining that the data is not encrypted, to read out the data stored in the storage unit.

In a fourth aspect of the present invention, there is provided a method of controlling an image processing apparatus including a storage unit that stores data, comprising providing an encrypted data area for storing encrypted data and an unencrypted data area for storing unencrypted data, in the storage unit, and making it impossible to read out an encryption key used when data stored in the encrypted data area is encrypted or information necessary for creating the encryption key, and making it impossible to read out data stored in the unencrypted data area from the storage unit.

In a fifth aspect of the present invention, there is provided a non-transitory computer-readable storage medium storing a computer-executable program for executing a method of controlling an image processing apparatus including a storage unit that stores data, wherein the method comprises determining whether or not data stored in the storage unit is encrypted, making it impossible, in a case where it is determined by said determining that the data is encrypted, to read out an encryption key used for encryption or information necessary for creating the encryption key, and making it impossible, in a case where it is determined by said determining that the data is not encrypted, to read out the data stored in the storage unit.

In a sixth aspect of the present invention, there is provided a non-transitory computer-readable storage medium storing a computer-executable program for executing a method of controlling an image processing apparatus including a storage unit that stores data, wherein the method comprises providing an encrypted data area for storing encrypted data and an unencrypted data area for storing unencrypted data, in the storage unit, and making it impossible to read out an encryption key used when data stored in the encrypted data area is encrypted or information necessary for creating the encryption key from, and making it impossible to read out data stored in the unencrypted data area from the storage unit.

According to the present invention, it is possible to improve the user-friendliness of the image processing apparatus by reducing a time period required to invalidate data while maintaining security against data leakage.

Further features of the present invention will become apparent from the following description of exemplary embodiments (with reference to the attached drawings).

BRIEF DESCRIPTION OF THE DRAWINGS

FIG. 7 is a flowchart of a process for deleting all data stored in an image processing apparatus according to a second embodiment of the present invention.

FIG. 8 is a diagram showing an example of encryption setting management information managed by a data encryption section.

DESCRIPTION OF THE EMBODIMENTS

The present invention will now be described in detail below with reference to the accompanying drawings showing embodiments thereof.

Figure 1:
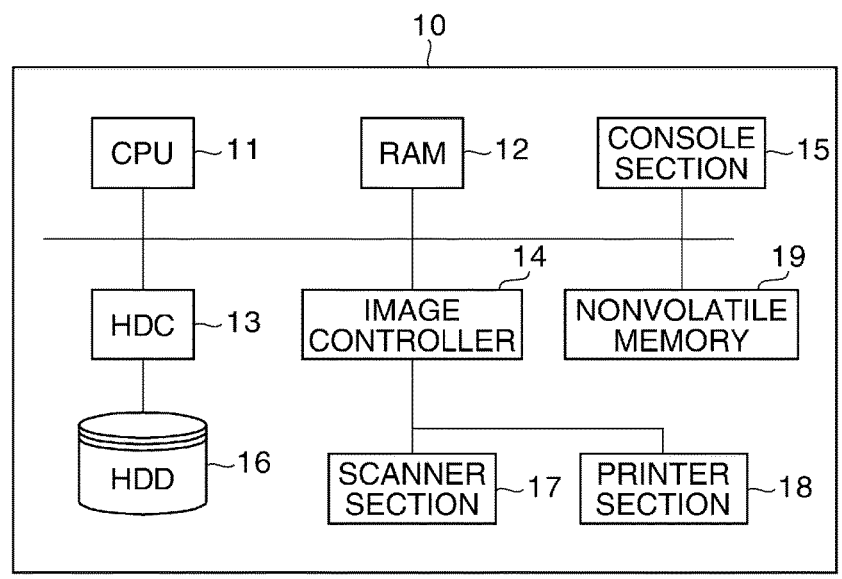
FIG. 1 is a block diagram showing a hardware configuration of an image processing apparatus according to a first embodiment of the present invention.

FIG. 1 is a block diagram showing a hardware configuration of an image processing apparatus according to a first embodiment of the present invention.

The image processing apparatus, denoted by reference numeral 10, is comprised of a CPU 11, a RAM 12, a hard disk controller (HDC) 13, an image controller 14, a console section (user interface) 15, a hard disk drive (HDD) 16, a scanner section 17, a printer section 18, and a nonvolatile memory 19.

The CPU 11 is a controller for controlling the overall operation of the image processing apparatus 10, and performs control processing by reading programs and data stored in the RAM 12. The RAM 12 is a readable and writable volatile storage device for temporarily holding programs and image data. The HDD 16 is a readable and writable nonvolatile storage device for holding programs, image data, user settings, and so forth, as files. The HDC 13 is a controller for controlling the HDD 16, and controls writing and reading of data in and from the HDD 16.

The image controller 14 is a controller for controlling the scanner section 17 and the printer section 18. The image controller 14 transfers image data to be stored, which is obtained from the scanner 17, to the RAM 12, and transfers image data stored in the RAM 12 to the printer section 18 according to an instruction from a data input and output controller 23 appearing in FIG. 2, described hereinafter. The scanner section 17, which is comprised of an original illuminating lamp, a scanning mirror, a CCD sensor, and so forth, none of which are shown, and reads light reflected from the original via the scanning mirror, lenses, etc., with a CCD sensor to create image data, and transfers the created image data to the RAM 12. The printer section 18, which is comprised of a laser, a polygon scanner, photosensitive drums, and so forth, none of which are shown, converts image data transferred from the RAM 12 to electric signals, and irradiates the photosensitive drums with laser beams based on the electric signals to thereby form an image on a sheet.

The console section 15, which is comprised of a liquid crystal display section, a touch panel, hard keys, and so forth, none of which are shown, receives an operation instruction from a user, and displays the state of the image processing apparatus 10 and so forth.

The nonvolatile memory 19 is a readable and writable nonvolatile storage device implemented e.g. by a flash memory, for storing programs, an encryption key, referred to hereinafter, and so forth.

The image processing apparatus 10 is not limited to the illustrated configuration, and may include a network connection section for connecting to a LAN, and a FAX input/output controller for transmitting/receiving a FAX.

Further, although in the present embodiment, the HDD 16 is used as a nonvolatile storage device for storing image data and user setting information, the nonvolatile memory 19 or a nonvolatile storage device, such as an SSD (Solid State Drive), not shown, may be used for the purpose. Further, a plurality of storage devices may be used in combination.

Figure 2:
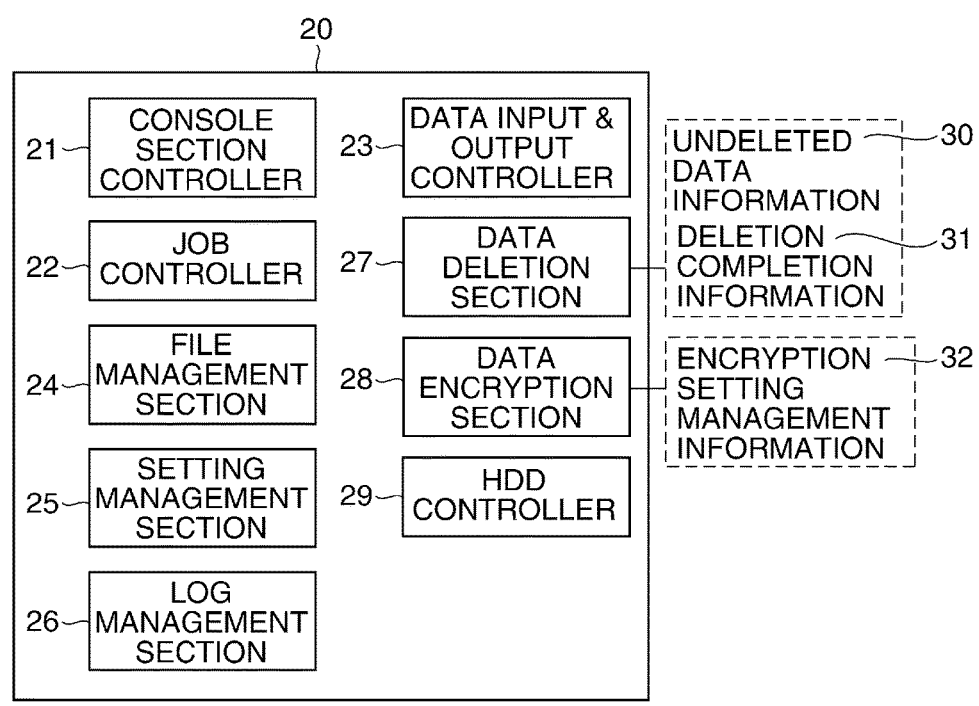
FIG. 2 is a block diagram showing the software configuration of the image processing apparatus shown in FIG. 1.

FIG. 2 is a block diagram showing the software configuration of the image processing apparatus 10 shown in FIG. 1.

An image processing apparatus control program 20 is a program module which is stored in the RAM 12 and is executed by the CPU 11 for controlling the image processing apparatus 10. The image processing apparatus control program 20 is comprised of various programs: a user interface controller 21, a job controller 22, the data input and output controller 23, a file management section 24, a setting management section 25, a log management section 26, a data deletion section 27, a data encryption section 28, and an HDD controller 29.

The console section controller 21 is a program for controlling the console section 15, which receives an instruction from a user via the touch panel, and displays the state of the image processing apparatus 10 on the liquid crystal panel.

The job controller 22 is a program for controlling processing (job), such as copying, performed by the image processing apparatus 10, and performs a job in cooperation with the console section controller 21, the data input and output controller 23, the file management section 24, and so forth.

The data input and output controller 23 is a program for controlling the image controller 14, and exchanges data with the RAM 12, to thereby hold image data in the RAM 12 and transmit image data stored in the RAM 12 to the printer section 18.

The file management section 24 is a program for reading and writing data from and into the HDD 16, and manages a file system created on the HDD 16 to thereby store and read each data item in and from the HDD 16, as a file.

The setting management section 25 is a program for managing settings of various operations of the image processing apparatus 10 and settings of user information and an address book, and stores settings designated by the console section controller 21 in the HDD 16, as a file, in cooperation with the file management section 24.

The log management section 26 is a program for recording results of processing performed by the job controller 22 and the setting management section 25, as a log, and stores the recorded log data in the HDD 16, as a file, in cooperation with the file management section 24.

The data deletion section 27 is a program for deleting all data, such as image data and log data, stored in the image processing apparatus 10, and performs overwrite deletion based on an instruction from the console section controller 21. Overwrite deletion is performed by deleting file information managed by the file management section 24, and then writing overwriting data into the whole of each partition, described hereinafter. The method of overwrite deletion is not limited to this. The data deletion section 27 manages undeleted data information 30 and deletion completion information 31, and updates these information items on an as-needed basis while performing deletion operation.

The data encryption section 28 performs encryption processing on data passed from the file management section 24 to the HDD controller 29. The data encryption section 28 holds encryption setting management information 32, and manages storage areas for encryption in the HDD 16 and information of an encryption key (e.g. information (seed value) required to create an encryption key) based on the encryption setting management information 32. Processing for encrypting data will be described hereinafter.

The HDD controller 29 reads and writes data from and into the HDD 16 according to respective requests from the file management section 24, the data deletion section 27, and the data encryption section 28.

Figure 3:
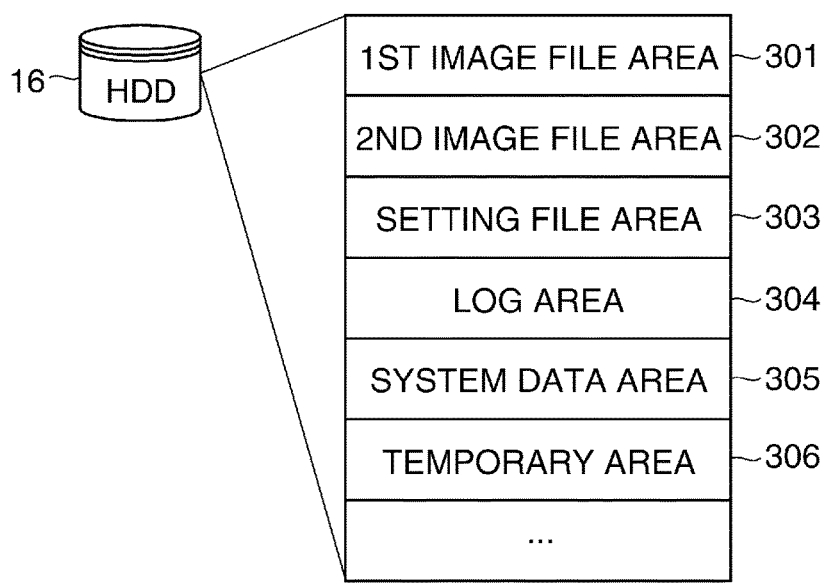
FIG. 3 is a diagram showing partitions formed in an HDD.

FIG. 3 is a diagram showing partitions formed in the HDD 16.

As shown in FIG. 3, the HDD 16 is managed by dividing the same into a plurality of partitions. Reference numerals 301 and 302 denote two image file areas (first and second image file areas) for mainly storing data associated with images used by the job controller 22. Reference numeral 303 denotes a setting file area for storing data of various settings managed by the setting management section 25. Reference numeral 304 denotes a log area for storing data of results of processing performed by the job controller 22 and the setting management section 25, which are recorded by the log management section 26. Reference numeral 305 denotes a system data area for storing various data required for the operation of the image processing apparatus control program 20. Reference numeral 306 denotes a temporary area for storing data temporarily used by the image processing apparatus control program 20.

Although in the present embodiment, a case where the partitions shown in FIG. 3 are formed in the HDD 16 is described, the partitions may be set to a plurality of nonvolatile storage devices in a distributed manner. Further, the partitions formed in the HDD 16 may not be physically configured partitions, but be logically configured partitions managed by the file management section 24.

Next, a description will be given of a process performed by the image processing apparatus 10 for inputting/outputting data to and from the HDD 16, with reference to FIGS. 4A and 4B.

Figure 4A:
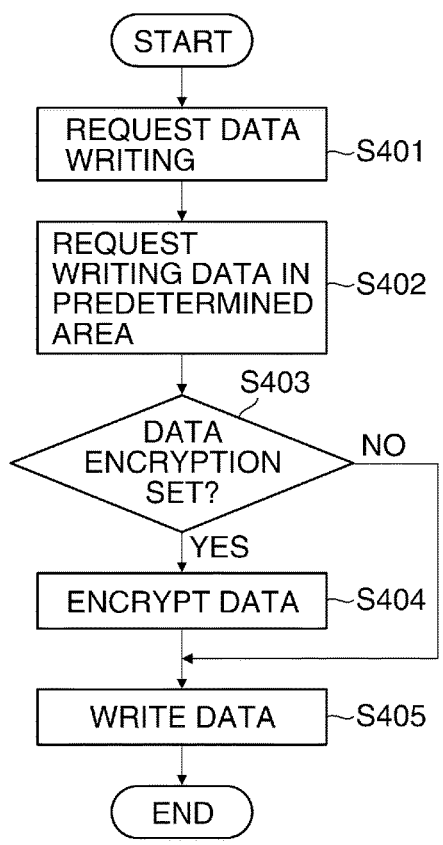
FIG. 4A is a flowchart of a process for writing data in the HDD.

FIG. 4A is a flowchart of a process for writing data into the HDD 16. The present process is performed by the CPU 11.

First, in a step S401, the job controller 22, the setting management section 25, or the like requests the file management section 24 to write data into the HDD 16.

In order to write the data in a predetermined area of the HDD 16, the file management section 24 requests the data encryption section 28 to execute writing of the data (step S402).

Upon receipt of a request for executing writing of the data from the file management section 24, the data encryption section 28 determines whether it is necessary to encrypt the data which is to be written into the HDD 16 (step S403). Specifically, the data encryption section 28 determines based on the encryption setting management information 32 whether or not a data writing area of the HDD 16, which is designated by the file management section 24, is an area in which data is to be encrypted (hereafter referred to as an "encryption area"). FIG. 8 shows an example of the encryption setting management information 32 managed by the data encryption section 28.

Referring to FIG. 8, in the encryption setting management information 32, for each of a plurality of storage areas set in the HDD 16, a starting address of each area, an encryption setting, and information of an encryption key are managed. In the illustrated encryption setting management information 32, the areas other than the system data area and the temporary area are set to be encrypted. For example, if a data writing request from the file management section 24 is a request for writing data into either of the first and second image file areas, the data encryption section 28 determines based on the illustrated encryption setting management information 32 that the area designated by the data writing request is an encryption area.

Although an encryption area which is managed by the encryption setting management information 32 can be directly set for the image processing apparatus 10 by a user, it may be set in advance e.g. at a stage of production of the image processing apparatus 10. For example, in a case where a setting is made to encrypt all data to be stored in the HDD 16, if this setting is valid, the setting is registered in the encryption setting management information 32 such that all storage areas are encryption areas. Further, the encryption setting management information 32 may be configured such that the setting can be changed according to whether or not a user's license exists or whether or not optional hardware is used. Further, although the illustrated encryption setting management information 32 is configured as a table managed for each area, the encryption setting management information 32 may be configured such that only one setting is made for the whole nonvolatile storage device.

Each of encryption keys for use in encryption of data is stored in the nonvolatile memory 19, and before encryption, it is read from the nonvolatile memory 19 to perform encryption of the data. Which key to be used is controlled based on the encryption setting management information 32. Further, the encryption key is not necessarily required to be read out whenever encryption of data is performed, but may be managed in the RAM 12 after the encryption key is once read out. To safely manage each encryption key, there may be used a method of further encrypting the encryption key for storage in the nonvolatile memory 19, a method of managing the encryption key using a secure chip, and a method of reconstructing the encryption key by combining the information stored in the nonvolatile memory 19 and other information. Further, the encryption key may be automatically created e.g. when the apparatus is started, when the HDD is used, or at like other timing. Although in the encryption setting management information 32, an encryption key and an encryption algorithm can be set for each area, detailed description thereof is omitted here.

Referring back to FIG. 4A, if it is determined in the step S403 that the data is required to be encrypted, the data encryption section 28 encrypts the data, and passes the encrypted data to the HDD controller 29 (step S404).

The HDD controller 29 writes the received data into the predetermined area in the HDD 16 (step S405), followed by terminating the present process.

On the other hand, if it is determined in the step S403 that the data is not required to be encrypted, the data encryption section 28 directly passes the data to the HDD controller 29 without encrypting the data. The HDD controller 29 writes the received data into the predetermined area in the HDD 16 (step S405), followed by terminating the present process.

Next, a process for reading data from the HDD 16 will be described.

Figure 4B:
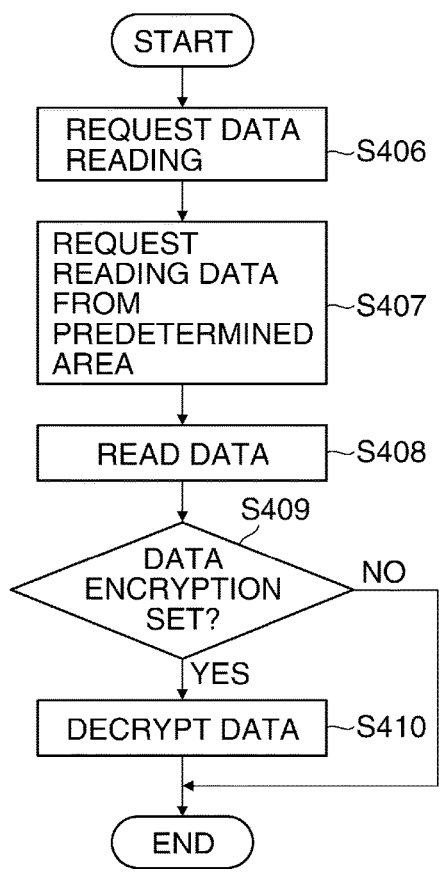
FIG. 4B is a flowchart of a process for reading data from the HDD.

FIG. 4B is a flowchart of the process for reading data from the HDD 16. The present process is performed by the CPU 11.

First, in a step S406, the job controller 22, the setting management section 25, or the like requests the file management section 24 to read data from the HDD 16.

In order to read the data from a predetermined area in the HDD 16, the file management section 24 requests the data encryption section 28 to execute reading of the data (step S407).

The data encryption section 28 requests the HDD controller 29 to read the data. As a result, the HDD controller 29 reads the data from the HDD 16 (step S408).

Next, in a step S409, the data encryption section 28 determines whether or not the data read in the step S408 is encrypted data. In the step S409, similarly to the step S403, the data encryption section 28 determines based on the encryption setting management information 32 whether or not the area from which the data is read is an encryption area where data is encrypted. If it is determined that the area is an encryption area where data is encrypted, the data encryption section 28 decrypts the data read in the step S408, and passes the decrypted data to the file management section 24 (step S410), followed by terminating the present process.

On the other hand, if it is determined in the step S409 that the area is not an encryption area where data is encrypted, the data encryption section 28 directly passes the read data to the file management section 24, followed by terminating the present process.

Thus performed are the processes for inputting/outputting data in and from the HDD 16 in the present embodiment.

Note that in the above-described processes, the description has been given of a configuration in which processing by the data encryption section 28 is executed between the processing by the file management section 24 and processing by the HDD controller 29. However, the processing by the data encryption section 28 may be executed before the processing by the file management section 24 or after the processing by the HDD controller 29. Further, the processing by the data encryption section 28 may be performed in a distributed manner such that part of the processing by the data encryption section 28 is executed before the processing by the file management section 24, and the other part is executed after the processing by the HDD controller 29. However, the distributed processes are each assumed to be managed by the encryption setting management information 32.

Figure 9:
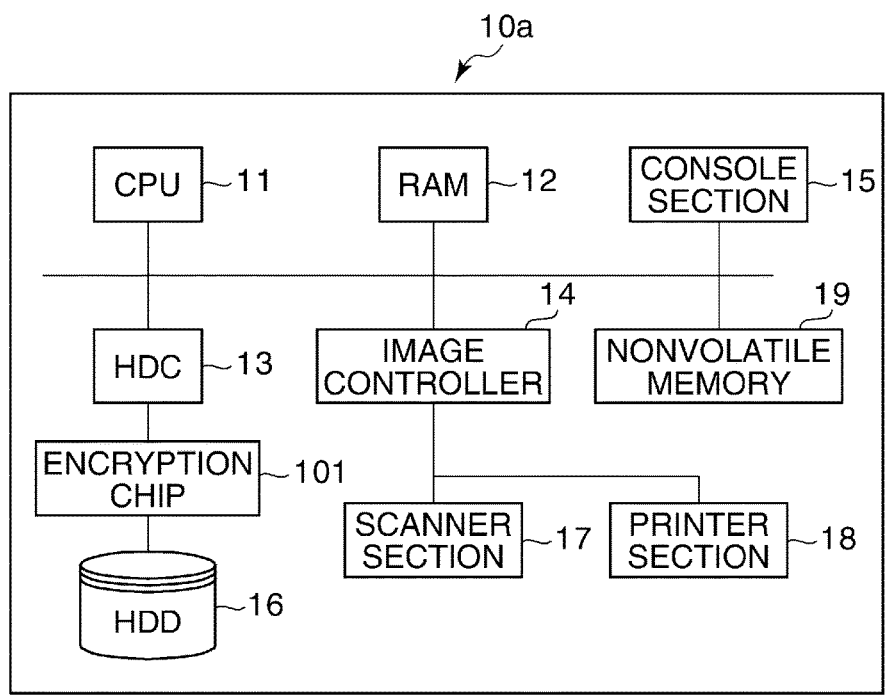
FIG. 9 is a block diagram showing a hardware configuration of an image processing apparatus that performs encryption using dedicated hardware.

Although in the above description of the present embodiment, data encryption is realized by using the software, data encryption may be realized by using dedicated hardware as shown in FIG. 9.

FIG. 9 is a block diagram showing a hardware configuration of an image processing apparatus 10a that performs encryption using dedicated hardware.

Referring to FIG. 9, the image processing apparatus 10a as a variation of the image processing apparatus 10 according to the present embodiment shown in FIG. 1 differs from the image processing apparatus 10 in that an encryption chip 101 is added. Description of the component elements other than the encryption chip 101 is omitted.

The encryption chip 101 is disposed between the HDC 13 and the HDD 16, and encrypts all data written by the HDC 13 into the HDD 16. On the other hand, when the HDC 13 reads out data from the HDD 16, the encryption chip 101 decrypts the data, and passes the decrypted data to the HDC 13.

The encryption chip 101 is configured to be removable from the image processing apparatus 10a, and is provided as an option for the image processing apparatus 10, for example. When the encryption chip 101 is mounted on the image processing apparatus 10 to form the image processing apparatus 10a, the image processing apparatus 10a sets all areas of the encryption chip 101 in the encryption setting management information 32 as an encryption area. Therefore, in the determinations performed in the steps S403 and S409 in FIGS. 4A and 4B, whether or not the area is an encryption area is determined depending on whether or not the encryption chip 101 is mounted.

Next, a description will be given of a process for deleting all data stored in the image processing apparatus 10 with reference to FIG. 5.

The data deletion process by the image processing apparatus 10 is performed e.g. when a user who uses the image processing apparatus 10 discards the image processing apparatus 10.

Figure 5:
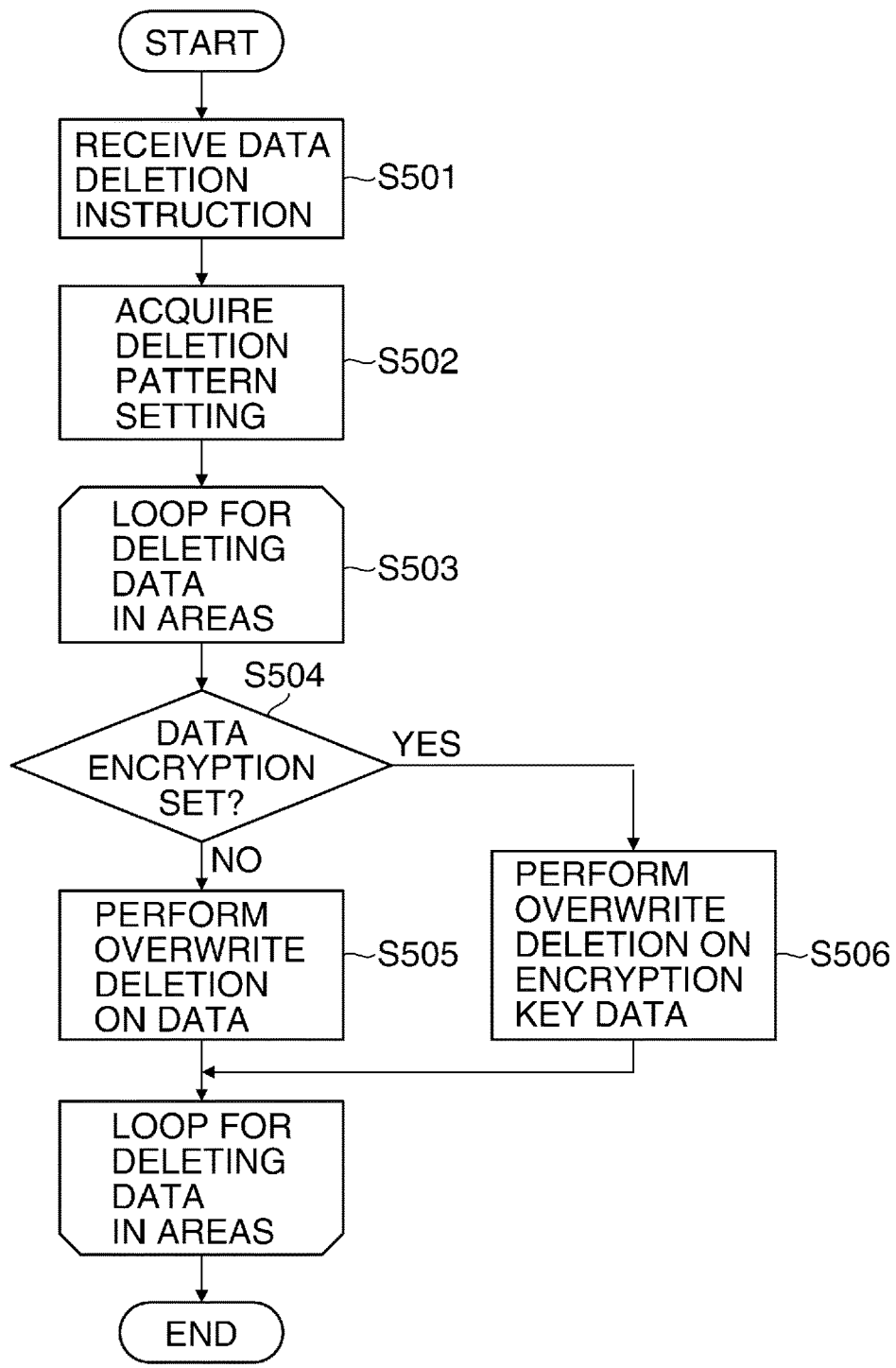
FIG. 5 is a flowchart of a process for deleting all data stored in the image processing apparatus.

FIG. 5 is a flowchart of the process for deleting all data stored in the image processing apparatus 10. The present process is performed by the CPU 11.

Figure 6A:
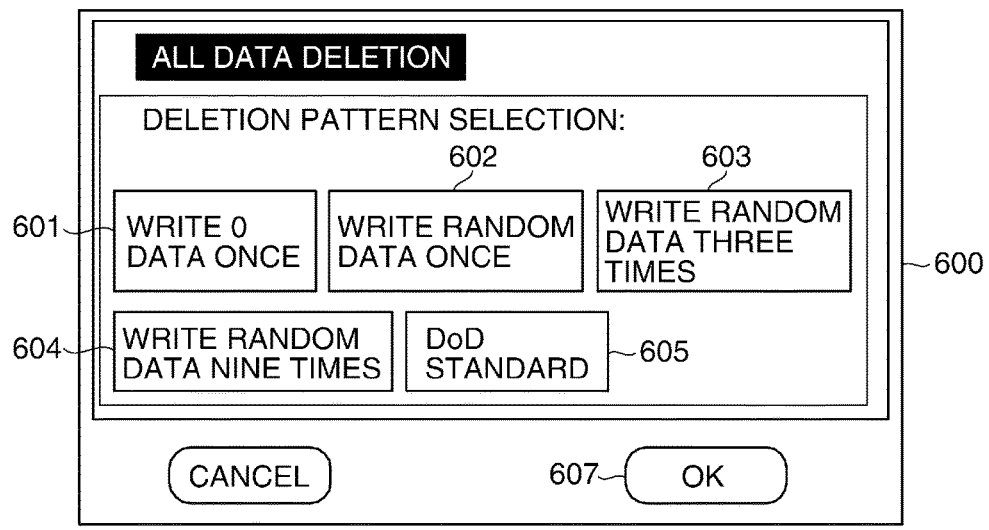
FIG. 6A is a diagram showing an example of a screen displayed on a user interface by a user interface controller in a step in FIG. 5.

First, in a step S501, the image processing apparatus 10 receives a data deletion instruction from a user. For example, a screen 600 shown in FIG. 6A is displayed on the console section 15 by the console section controller 21 to prompt the user to select a deletion pattern. When the user selects one of a plurality of deletion patterns (601 to 605) on the screen 600, and presses an OK button 607 on the screen 600, the console section controller 21 receives the instruction from the user.

On the screen 600, any of five patterns of "write 0 data once" 601, "write random data once" 602, "write random data three times" 603, "write random data nine times" 604, and "DoD standard" 605 can be selected as the deletion pattern. The deletion pattern is not limited to these, but the user may be caused to select a predetermined number of times of execution of overwrite processing using predetermined data.

Upon receipt of a data deletion instruction from the user in the step S501, the data deletion section 27 acquires the setting information of the deletion pattern selected by the user (step S502), and starts deletion of the data (step S503). The data deletion section 27 performs overwrite deletion on all the areas shown in FIG. 3 except the system data area 305 in the following manner.

In a step S504, the data deletion section 27 inquires the data encryption section 28 whether or not a deletion target area is an encryption area. The data encryption section 28 determines whether or not the deletion target area is an encryption area similarly to the step S403 in FIG. 4A. If it is determined based on a result of the determination that the deletion target area is not an encryption area, the data deletion section 27 performs overwrite processing of data for the deletion target area, by the deletion pattern acquired in the step S502 (step S505). In this overwrite processing, the data deletion section 27 passes the overwrite pattern data to the HDD controller 29, and the HDD controller 29 overwrites data on all of the deletion target areas, by the overwrite pattern. If a plurality of times of data writing is designated by the deletion pattern acquired in the step S502, the data deletion section 27 repeats overwrite processing the designated number of times.

On the other hand, if it is determined in the step S504 that the deletion target area is an encryption area, the data deletion section 27 refers to the encryption setting management information 32 managed by the data encryption section 28, and acquires location information of the area storing the encryption key on the nonvolatile memory 19. Then, the data deletion section 27 performs, based on the acquired location information, overwrite processing of data by the overwrite pattern for the area storing the encryption key in the nonvolatile memory 19 (step S506). Note that writing of data by the overwrite pattern may be performed not only on the area storing the encryption key, but also on a storage area storing information necessary for creating the encryption key.

As described above, the data deletion section 27 repeats the above-described step S504 and the step S505 or S506 on all of the areas other than the system data area 305 shown in FIG. 3. At this time, the data deletion section 27 refers to the undeleted data information 30, performs overwriting on undeleted data (or data area), registers the area in the deletion completion information 31, and determines whether or not overwrite deletion has been performed on all data in the deletion target areas.

As described above, in the present embodiment, data stored in the storage device is discriminated between encrypted data and unencrypted data, and overwrite deletion is performed on the encrypted data such that an encryption key used in encryption can no longer be read out. On the other hand, overwrite deletion is performed on the unencrypted data such that the data can no longer be read out from the storage device. Thus, overwrite deletion is performed after determining whether overwrite deletion is to be performed on data or an encryption key, and hence it is possible to reduce time required to delete data. As a consequence, it is possible to reduce the time required to invalidate data to the minimum possible while maintaining security against data leakage.

Next, as a second embodiment of the present invention, a description will be given of a method of making it possible to select whether or not to delete data in a data area even in a case where the data is encrypted. The second embodiment has the same configurations as those of the first embodiment described with reference to FIGS. 1 to 3. Therefore, the same components as those of the first embodiment are denoted by the same reference numerals, and description thereof is omitted. The following description is given of only different points from the first embodiment.

FIG. 7 is a flowchart of a process for deleting all data stored in the image processing apparatus according to the second embodiment of the present invention. The present process is performed by the CPU 11.

Figure 6B:
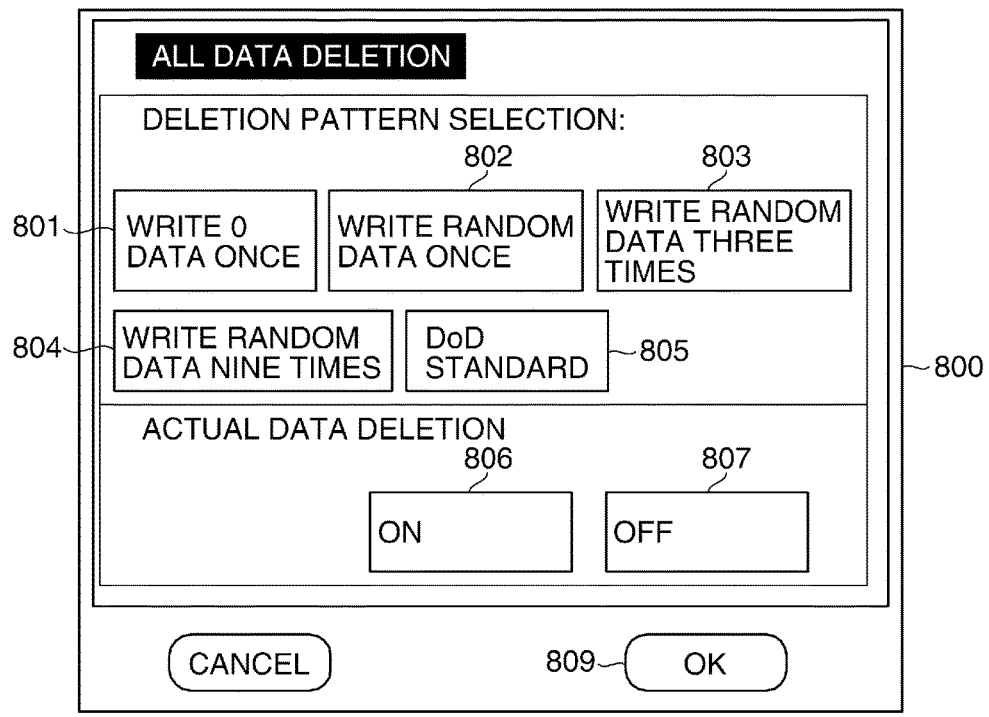
FIG. 6B is a diagram showing an example of a screen displayed on the user interface by the user interface controller in a step in FIG. 7.

First, in a step S701, the image processing apparatus 10 receives a data deletion instruction from a user. For example, a screen 800 shown in FIG. 6B is displayed on the console section 15 by the console section controller 21 to prompt the user to select a deletion pattern and an actual data deletion setting. When the user selects one of a plurality of deletion patterns (801 to 805) and "ON" 806 or "OFF" 807 of actual data deletion on the screen 800, and presses an OK button 809, the console section controller 21 receives the user's instruction.

On the screen 800, any of five patterns of "write 0 data once" 801, "write random data once" 802, "write random data three times" 803, "write random data nine times" 804, and "DoD standard" 805 can be selected as the deletion pattern. The deletion pattern is not limited to these, but the user may be prompted to designate a desired number of times of execution of deletion.

Further, the actual data deletion setting on the screen 800 is a setting for selecting whether or not to delete data in a data area of a deletion target area even when the data is encrypted. When "ON" 806 is selected, overwrite deletion is performed for the data area, whereas when "OFF" 807 is selected, overwrite deletion is performed only for an area storing the encryption key. That is, overwrite deletion of data in the data area, described in the first embodiment, is not performed. Although in the present embodiment, "ON" 806 or "OFF" 807 is set for all of the areas, the configuration may be such that the actual data setting can be selected on an area-by-area basis or on a data type-by-data type basis.

Upon receipt of the data deletion instruction from the user in the step S701, the data deletion section 27 acquires the setting information of the deletion pattern selected by the user (step S702), further acquires the value of the actual data deletion setting (step S703), and then starts deletion of the data (step S704). The data deletion section 27 performs overwrite deletion on all the areas shown in FIG. 3 except the system data area 305 in the following manner.

In a step S705, the data deletion section 27 inquires the data encryption section 28 whether or not the deletion target area is an encryption area. The data encryption section 28 determines whether or not the deletion target area is an encryption area similarly to the step S403 in FIG. 4A. If it is determined based on a result of the determination that the deletion target area is not an encryption area, the data deletion section 27 performs overwrite processing of data by the deletion pattern acquired in the step S702 for the deletion target area (step S707). This overwrite processing is the same as that performed in the step S505 in FIG. 5.

On the other hand, if it is determined in the step S705 that the deletion target area is an encryption area, the data deletion section 27 refers to the actual data deletion setting acquired in the step S703, and determines whether the setting of actual data deletion is "ON" or "OFF" (step S706). If it is determined that the setting is "ON", the process proceeds to the step S707, wherein the data deletion section 27 performs the above-described overwrite processing of data.

On the other hand, if it is determined in the step S706 that the setting is "OFF", the data deletion section 27 refers to the encryption setting management information 32 managed by the data encryption section 28, and acquires location information of an area storing the encryption key in the nonvolatile memory 19. Then, the data deletion section 27 performs, based on the acquired location information, overwrite processing of data by the overwrite pattern for the area storing the encryption key in the nonvolatile memory 19 (step S708).

As described above, the data deletion section 27 repeats the above-described steps S705, S706, and S707 or S708 on all the areas other than the system data area 305, shown in FIG. 3. At this time, the data deletion section 27 refers to the undeleted data information 30, performs overwriting on the undeleted data (or data area), registers the area in the deletion completion information 31, and determines whether or not overwrite deletion has been performed on all data in the deletion target areas.

As described above, in the present embodiment, the user is enabled to select whether or not to delete actual data even when the data is encrypted, whereby it is possible to reduce the time required to invalidate data and also reduce user's concern about security.

In the first and second embodiments, overwriting of data is performed based on the deletion pattern acquired in the step S502 in FIG. 5 and the step S702 in FIG. 7. However, in a case where the nonvolatile storage device which stores data or an encryption key is e.g. a flash memory, if the overwrite pattern is "write 0 data once", this is enough to delete the data. Therefore, the manner of setting the deletion pattern is not limited to those described in the embodiments, but the deletion pattern may be fixed according to characteristics of a nonvolatile storage device or may be selectively set for each object area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-014560 filed Jan. 29, 2014, which is hereby incorporated by reference herein in its entirety.

What is claimed is:

1. An image processing apparatus comprising:
a processor and memory configured to:
store data and an encryption key which is different from the data in a storage;
set a setting regarding a predetermined skip operation;
determine whether or not data stored in said storage is encrypted;
overwrite, in a case where it is determined that the data is encrypted and the setting allows skipping a process of deleting of the data stored in the storage, the encryption key or information necessary for creating the encryption key, while skipping a process of deleting of the data in the storage, wherein the data is different from the encryption key or the information necessary for creating the encryption key, wherein the skipping the process of deleting of the data stored in the storage is not performed in a case where the setting does not allow the skipping; and
overwrite, in a case where it is determined that the data is not encrypted, whether or not the setting allows skipping a process of deleting of the data stored in the storage, the data stored in said storage,
wherein, in a case where it is determined that the data is encrypted, overwrite processing is performed using predetermined data a predetermined number of times for a storage area, in which the encryption key or the information necessary for creating the encryption key is stored, of said storage,
wherein, in a case where it is determined that the data is not encrypted, overwrite processing is performed a predetermined number of times for a storage area, in which the data is stored, of said storage, using data which is different from the stored data, and
wherein the predetermined number of times of overwrite processing is selectable via a user interface screen.

2. The image processing apparatus according to claim 1, wherein said determination of whether or not data stored in said storage is encrypted is performed according to a deleting instruction by a user, whereby overwriting is executed.

3. The image processing apparatus according to claim 1, the processor and memory being further configured to:
setting the overwriting of the data stored in said storage, and
wherein even in a case where it is determined that the data is encrypted, the data stored in said storage is overwritten, in accordance that the setting.

4. The image processing apparatus according to claim 1, the processor and memory being further configured to:
encrypt data to be stored in a predetermined storage area, which is set in advance, of a plurality of storage areas formed in said storage.

5. The image processing apparatus according to claim 1, wherein the storage is a random-access storage drive.

6. An image processing apparatus comprising:
a processor and memory configured to:
include in a storage an encrypted data area for storing data which is encrypted, and an unencrypted data area for storing data which is not encrypted; and
set a setting regarding a predetermined skip operation;
overwrite an encryption key and skip a process of overwriting the data stored in the data in the encrypted data area in a case where data stored in the encrypted data area is encrypted and the setting allows skipping a process of deleting of the data stored in the storage, or overwrite information for creating the encryption key, and overwrite the data stored in the unencrypted data area from said storage, even in a case that the setting allows skipping a process of deleting of the data stored in the storage, wherein the data is different from the encryption key or the information for creating the encryption key, wherein the skipping the process of deleting of the data stored in the storage is not performed in a case where the setting does not allow the skipping, wherein the encryption key, or information for creating the encryption key, is overwritten, using predetermined data, a predetermined number of times, wherein, the data stored in the unencrypted data area is overwritten a predetermined number of times, using data which is different from the stored data, and wherein the predetermined number of times of overwriting is selectable via a user interface screen.

7. A method of controlling an image processing apparatus including a storage that stores data and an encryption key which is different from the data, the method comprising:

setting a setting regarding a predetermined skip operation;

determining whether or not data stored in the storage is encrypted;

overwriting, in a case where it is determined by said determining that the data is encrypted and the setting allows skipping a process of deleting of the data stored in the storage, an encryption key used for encryption or information necessary for creating the encryption key, while skipping a process of deleting the data in the storage, wherein the data is different from the encryption key or the information necessary for creating the encryption key, wherein the skipping the process of deleting of the data stored in the storage is not performed in a case where the setting does not allow the skipping; and overwriting, in a case where it is determined by said determining that the data is not encrypted, whether or not the setting allows skipping a process of deleting of the data stored in the storage, data stored in the storage, wherein, in a case where it is determined that the data is encrypted, overwriting is performed using predetermined data a predetermined number of times for a storage area, in which the encryption key or the information necessary for creating the encryption key is stored, of said storage, wherein, in a case where it is determined that the data is not encrypted, overwriting is performed a predetermined number of times for a storage area, in which the data is stored, of said storage, using data which is different from the stored data, and wherein the predetermined number of times of overwriting is selectable via a user interface screen.

8. A method of controlling an image processing apparatus including a storage that stores data, the method comprising:

providing an encrypted data area for storing encrypted data and an unencrypted data area for storing unencrypted data, in the storage; and setting a setting regarding a predetermined skip operation;

overwriting an encryption key used and skipping the overwriting the data stored in the data in the encrypted data area in a case where data stored in the encrypted data area is encrypted and the setting allows skipping a process of deleting of the data stored in the storage, or overwriting information for creating the encryption key, and overwriting the data stored in the unencrypted data area from the storage, even in a case that the setting allows skipping a process of deleting of the data stored in the storage, wherein the data is different from the encryption key or the information for creating the encryption key, wherein the skipping the process of deleting of the data stored in the storage is not performed in a case where the setting does not allow the skipping, wherein the encryption key, or information for creating the encryption key, is overwritten, using predetermined data, a predetermined number of times, wherein, the data stored in the unencrypted data area is overwritten a predetermined number of times, using data which is different from the stored data, and wherein the predetermined number of times of overwriting is selectable via a user interface screen.

9. A non-transitory computer-readable storage medium storing a computer-executable program for executing a method of controlling an image processing apparatus including a storage that stores data and an encryption key which is different from the data, wherein the method comprises:

setting a setting regarding a predetermined skip operation;

determining whether or not data stored in the storage is encrypted;

overwriting, in a case where it is determined by said determining that the data is encrypted and the setting allows skipping a process of deleting of the data stored in the storage, an encryption key used for encryption or information necessary for creating the encryption key, while skipping a process of deleting the data in the storage, wherein the data is different from the encryption key or the information necessary for creating the encryption key, wherein the skipping the process of deleting of the data stored in the storage is not performed in a case where the setting does not allow the skipping; and overwriting, in a case where it is determined by said determining that the data is not encrypted, whether or not the setting allows skipping a process of deleting of the data stored in the storage, data stored in the storage, wherein, in a case where it is determined that the data is encrypted, overwriting is performed using predetermined data a predetermined number of times for a storage area, in which the encryption key or the information necessary for creating the encryption key is stored, of said storage, wherein, in a case where it is determined that the data is not encrypted, overwriting is performed a predetermined number of times for a storage area, in which the data is stored, of said storage, using data which is different from the stored data, and wherein the predetermined number of times of overwriting is selectable via a user interface screen.

10. A non-transitory computer-readable storage medium storing a computer-executable program for executing a method of controlling an image processing apparatus including a storage that stores data, wherein the method comprises:

providing an encrypted data area for storing encrypted data and an unencrypted data area for storing unencrypted data, in the storage; and setting a setting regarding a predetermined skip operation;

overwriting an encryption key used and skipping the overwriting the data stored in the data in the encrypted data area in a case where data stored in the encrypted data area is encrypted and the setting allows skipping a process of deleting of the data stored in the storage, or overwriting information for creating the encryption key, and overwriting the data stored in the unencrypted data area from the storage, even in a case that the setting allows skipping a process of deleting of the data stored in the storage, wherein the data is different from the encryption key or the information for creating the encryption key, wherein the skipping the process of deleting of the data stored in the storage is not performed in a case where the setting does not allow the skipping, wherein the encryption key, or information for creating the encryption key, is overwritten, using predetermined data, a predetermined number of times, wherein, the data stored in the unencrypted data area is overwritten a predetermined number of times, using data which is different from the stored data, and wherein the predetermined number of times of overwriting is selectable via a user interface screen.

* * * * *